(12) United States Patent
Fort

(10) Patent No.: US 11,133,890 B2
(45) Date of Patent: Sep. 28, 2021

(54) ADAPTIVE MULTI-STANDARD SIGNAL CLASSIFICATION AND SYNCHRONIZATION

(71) Applicant: Qorvo US, Inc., Greensboro, NC (US)

(72) Inventor: Andrew Fort, Kessel Lo (BE)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/458,369

(22) Filed: Jul. 1, 2019

(65) Prior Publication Data

US 2020/0287658 A1 Sep. 10, 2020

Related U.S. Application Data

(60) Provisional application No. 62/815,290, filed on Mar. 7, 2019.

(51) Int. Cl.
*H04L 1/00* (2006.01)
*H04L 12/28* (2006.01)

(52) U.S. Cl.
CPC ........ *H04L 1/0031* (2013.01); *H04L 12/2827* (2013.01); *H04L 2012/2841* (2013.01)

(58) Field of Classification Search
CPC ............... H04L 1/0031; H04L 12/2827; H04L 2012/2841
See application file for complete search history.

(56) References Cited

U.S. PATENT DOCUMENTS 4,412,340 A * 10/1983 Bartlett ............... G06G 7/1928
375/343

5,574,639 A * 11/1996 Qian ................... G06K 9/00536
708/300
5,831,981 A 11/1998 Tanimura et al.
(Continued)

FOREIGN PATENT DOCUMENTS

WO 2018004332 A1 1/2018

OTHER PUBLICATIONS

Notice of Allowance for U.S. Appl. No. 15/825,294, dated Jan. 29, 2020, 7 pages.
(Continued)

*Primary Examiner* — Sam K Ahn
*Assistant Examiner* — Amneet Singh
(74) *Attorney, Agent, or Firm* — Withrow & Terranova, PLLC

(57) ABSTRACT

Adaptive multi-standard signal classification and synchronization is disclosed. Devices, systems and methods include an auto-correlation bank and a signal classifier to efficiently and reliably distinguish signals of wireless protocols, such as Bluetooth, 1 megabit-per-second (Mbps) Bluetooth low energy (BLE), 2 Mbps BLE, long range (LR) BLE, ZigBee (ZB), high-rate ZB, and so on. The auto-correlation bank includes a set of auto-correlators with different delays, which facilitate distinguishing between the different wireless protocols. Exemplary aspects can further distinguish and/or compensate for interference sources, such as WiFi, constant wave (CW) clock sources, and so on. In some examples, a frequency offset of an incoming signal can be output for further signal processing. In a parallel path, a cross-correlation circuit facilitates synchronization to the incoming signal based on a signal type identified by the signal classifier.

21 Claims, 7 Drawing Sheets

(56) References Cited

U.S. PATENT DOCUMENTS

| | | |
|---|---|---|
| 7,974,647 B2 | 7/2011 | Ho |
| 8,041,505 B2 | 10/2011 | Pierce et al. |
| 8,531,981 B2 | 9/2013 | Van Driest et al. |
| 9,912,512 B2 | 3/2018 | Zhao et al. |
| 2003/0161428 A1* | 8/2003 | Garrett ............... H04L 27/2662 375/368 |
| 2006/0014494 A1* | 1/2006 | Vanderperren ..... H04L 27/2675 455/63.1 |
| 2009/0003308 A1* | 1/2009 | Baxley ................... H04B 1/59 370/350 |
| 2011/0150150 A1* | 6/2011 | Sohn .................. H04L 27/2678 375/343 |
| 2013/0148766 A1* | 6/2013 | Urabe ................ H04L 27/2649 375/343 |
| 2018/0063873 A1* | 3/2018 | Desai ..................... H04L 41/12 |
| 2018/0131476 A1 | 5/2018 | Van Driest et al. |
| 2018/0249356 A1* | 8/2018 | Carvalho ............. H04W 24/08 |
| 2018/0324829 A1 | 11/2018 | Van Driest et al. |
| 2019/0166450 A1 | 5/2019 | Fort |

OTHER PUBLICATIONS

Author Unknown, "Core System Package [Low Energy Controller volume]," Specification of the Bluetooth System, vol. 6, Covered Core Package Version 4.2, Dec. 2, 2014, 193 pages.

Fort, Andrew, et al., "A Performance and Complexity Comparison of Auto-Correlation and Cross-Correlation for OFDM Burst Synchronization," International Conference on Acoustics, Speech, and Signal Processing, 2003, Hong Kong, IEEE, 4 pages.

Non-Final Office Action for U.S. Appl. No. 15/825,294, dated Oct. 22, 2019, 5 pages.

* cited by examiner

ADAPTIVE MULTI-STANDARD SIGNAL CLASSIFICATION AND SYNCHRONIZATION

RELATED APPLICATIONS

This application claims the benefit of provisional patent application Ser. No. 62/815,290, filed on Mar. 7, 2019, the disclosure of which is hereby incorporated herein by reference in its entirety.

FIELD OF THE DISCLOSURE

This application is related to classification of wireless signals. Some aspects relate to classification of low power wireless signals for internet of things (IoT) or similar applications.

BACKGROUND

Low power radio standards are being developed, including several new Bluetooth low energy (BLE) and ZigBee (ZB) modes of operation trading off data rate and range including 1 megabit-per-second (Mbps) BLE, 2 Mbps BLE, long range (LR) BLE, ZB, and high-rate ZB packets. These various standards need to function reliably in the presence of interference stemming from existing household radio systems, such as WiFi, as well as constant wave (CW) clock sources emanating from nearby electronics in small highly integrated set-top boxes and sensor devices. Accordingly, new signal processing techniques are needed which are capable of reliably distinguishing and synchronizing to any of these various packet formats in an interfering environment.

At the same time, LR BLE and other standards are needed in increasingly small and low-power devices. For example, home automation radio systems may be deployed in smart phones and a wide variety of home automation device nodes, such as light bulb switches and sensor devices. For flexibility and ease of installation, these radio systems may operate on small coin cell batteries. Thus, any multi-standard radio system geared towards home automation needs to achieve this extra signal processing at low cost and using low-power techniques.

FIG. 1 and FIG. 2 illustrate conventional techniques for detecting wireless signals. In this regard, FIG. 1 is a schematic diagram of a conventional auto-correlation technique 10 for detecting low power radio preambles. The auto-correlation technique 10 takes advantage of the fact that most common radio protocols used in the household, including BLE, LR BLE, WiFi, and ZB specify preambles containing a repeating pattern. The auto-correlation technique 10 correlates an incoming signal with itself delayed by a period equal to the period of these preambles (with a two symbol delay 12). The auto-correlation technique 10 includes a multiplier 14 and an integrator 16. The result has a larger magnitude when the preamble is present compared with noise. A magnitude 18 of the auto-correlation can be used to provide a timing estimate (e.g., using a maximizing function 20), while a phase measurement 22 can be used for a frequency offset estimate.

While this approach is very low power, it suffers from several drawbacks. First, the correlation of a noisy input signal with itself results in noise cross products and non-ideal performance. A second drawback of this approach is that the carrier frequency offset (CFO) range of the auto-correlation algorithm is limited by phase ambiguity. This is particularly problematic for LR BLE and ZB preambles which have long preamble periods resulting in a valid CFO estimation range of only 125 kiloHertz (kHz) and 62.5 kHz. This is lower than the maximum CFO allowed by these standards. Finally, the auto-correlation technique 10 is also susceptible to continuous wave interference deriving from, for example, nearby clock signals on chip or printed circuit board (PCB).

FIG. 2 is a schematic diagram of a conventional cross-correlation technique 24 for detecting low power radio preambles. The cross-correlation technique 24 correlates a preamble of an incoming signal against a known preamble. This is a more accurate synchronization technique than the auto-correlation technique 10 as there are no noise cross products, but it comes at a much higher cost since the frequency offset between the transmitter and receiver crystals is unknown. This requires performing the cross-correlation at multiple frequency offsets. For example, a first correlator 26(1) correlates against a first preamble at frequency f1, a second correlator 26(2) correlates against a second preamble at frequency f2, a third correlator 26(3) correlates against a third preamble at frequency f3, and an nth correlator 26(N) correlates against an nth preamble at frequency fn. The magnitude 18 of each correlator 26(1)-26(N) can be used to provide timing and frequency estimates (e.g., using the maximizing function 20).

At least 15 parallel correlations at different frequency offsets are required for robust performance in practice for low power standards such as BLE and ZB. Furthermore, this set of 15 correlators 26(1)-26(N) would need to be duplicated in order to concurrently monitor BLE and LR BLE signals on the same channel. In the case of BLE, this approach is particularly complex since BLE has a repeating "01010101" and "10101010" preamble when modulated with BLE's specified Gaussian minimum shift keying (GMSK) scheme. This preamble also correlates well with CW signals, making it susceptible to false detections from interfering narrowband systems. Furthermore, the preamble is often corrupted by automatic gain control mechanisms. As a result, some portion of the access code is typically included in the correlation at each frequency offset, resulting in additional power consumption and complexity.

FIG. 3 is a schematic diagram of a conventional synchronizing approach 28 for synchronizing to a WiFi orthogonal frequency division multiplexed (OFDM) radio preamble. The synchronizing approach 28 uses two or more stages (selected using a multiplexer 30) to refine the synchronization process. In a first phase, an auto-correlation algorithm is commonly used to estimate the frequency offset at low complexity and then compensate for the frequency offset using a CORDIC or similar algorithm. With the frequency offset removed, a single correlation can be performed reducing the complexity as compared with the cross-correlation technique 24 of FIG. 2. Thus, in the first phase, only a top portion 32 of FIG. 3 is active (with the two symbol delay 12). The timing of the end of the preamble is estimated based on the magnitude 18 and peak detection 34 of the auto-correlation. Once this timing is known, a phase measurement (angle output) 22 of the auto-correlation at this timing is used to obtain an estimate of the frequency offset.

In the second phase, a bottom portion 36 of FIG. 3 is activated and the auto-correlation algorithm (the top portion 32) is disabled. The frequency offset estimated in the first phase is compensated (with a frequency compensation circuit 38) and a single cross-correlation is performed (by one correlator 26) on a later portion of the preamble, often over a subset of timing offsets based on a coarse estimate provided by the magnitude 18 of the auto-correlation in the first phase. Peak detection 34 is performed on an output of the correlator 26. Other variations on this multi-stage approach involve using a second auto-correlation (in series with the correlator 26) or frequency domain synchronization technique on the compensated data during the second stage to refine the estimate.

While this approach can achieve excellent accuracy, it suffers from a couple of drawbacks. First, the auto-correlation CFO estimation range is limited if this approach were applied to LR BLE and ZB preambles. The range of the auto-correlation CFO estimate for the 8 us LR BLE preamble period is limited to only +/−62.5 kHz frequency offsets which is not good enough to cover the +/−250 kHz range requirements of the standard. A second drawback of this approach is that it uses the access code of the preamble as part of the synchronization process which costs delay. This is because the LR BLE standard specifies that radios must detect each bit of the access code so that, after synchronization with the access code, data must be stored in a buffer to facilitate returning to the beginning of the access code to detect it symbol-by-symbol.

FIG. 4 is a schematic diagram of an auto-correlation and cross-correlation hybrid approach 40 for detecting a radio preamble. Under the hybrid approach 40, a frequency estimate (from a phase measurement 22) selects correlator coefficients from a table of coefficients 42 at different frequency offsets. Rather than correlating against the access code in a second step, one benefit of this approach is that correlation 26 is performed against the same repeating preamble in parallel with an auto-correlation (using the multiplier 14 and integrator 16) so there is no extra delay on the algorithm. It also benefits from better accuracy than the auto-correlation technique 10 of FIG. 1 since the accuracy of the frequency estimate is not degraded by uncertainty in the peak of the auto-correlation magnitude function. Unfortunately, in the context of LR BLE and ZB, this hybrid approach 40 still suffers from limited CFO estimation range.

A final drawback of all the conventional approaches described above is that they must be duplicated to search for BLE and LR BLE signals concurrently on BLE advertising channels. While this feature is not required by the standard, this concurrency is a common feature among BLE radios in practice. In the context of emerging multi-standard radios which simultaneously listen to ZB, BLE, and LR BLE signals concurrently, the hardware must be reproduced three times to discriminate between and synchronize to all the relevant preambles. This can result in unacceptable power and area increase in the context of low-cost low-power internet of things (IoT) and home automation systems.

SUMMARY

This application relates to adaptive multi-standard signal classification and synchronization. Devices, systems and methods disclosed herein include an auto-correlation bank and a signal classifier to efficiently and reliably distinguish signals of wireless protocols, such as Bluetooth, 1 megabit-per-second (Mbps) Bluetooth low energy (BLE), 2 Mbps BLE, long range (LR) BLE, ZigBee (ZB), high-rate ZB, and so on. The auto-correlation bank includes a set of auto-correlators with different delays, which facilitate distinguishing between the different wireless protocols. Exemplary aspects can further distinguish and/or compensate for interference sources, such as WiFi, constant wave (CW) clock sources, and so on. In some examples, a frequency offset of an incoming signal can be output for further signal processing.

In another exemplary aspect, a parallel path is provided to frequency-compensate the incoming signal using an estimate of the carrier frequency offset (CFO) from the auto-correlation bank. This reduces the number of parallel correlators needed for synchronization of the incoming signal. The frequency compensated data can be cross-correlated against preamble coefficients of signal standards (e.g., BLE, LR BLE, or ZB) depending on the result of the signal classifier. If the signal classifier detects signals that are not relevant for the system, such as CW interference, WiFi interference, or noise, the correlators can be disabled. In addition, the number of correlators and correlation lengths can be scaled as needed depending on the type of incoming signal. This approach therefore re-uses hardware, saving cost and area, while conserving power by scaling key processing units depending on the incoming signal. Using a cross-correlation block for packet synchronization allows for more reliable performance, which is especially important for low data rate internet of things (IoT) standards operating at low signal to noise ratio (SNR), such as ZB and LR BLE.

An exemplary embodiment relates to a signal detector. The signal detector includes an auto-correlation bank configured to receive signal data for an incoming signal. The auto-correlation bank includes a first auto-correlator configured to correlate the signal data against itself at a first delay and a second auto-correlator configured to correlate the signal data against itself at a second delay. The signal detector further includes a signal classifier configured to classify the incoming signal based on a first output of the first auto-correlator and a second output of the second auto-correlator.

Another exemplary embodiment relates to a method for detecting a wireless signal. The method includes receiving signal data for an incoming signal, performing a first auto-correlation of the signal data at a first delay, and performing a second auto-correlation, concurrent with the first auto-correlation, of the signal data at a second delay. The method further includes classifying the incoming signal based on a first magnitude of the first auto-correlation and a second magnitude of the second auto-correlation.

Another exemplary embodiment relates to a signal processing system for an incoming signal. The signal processing system includes an auto-correlation bank configured to perform a plurality of auto-correlations of signal data of the incoming signal, each auto-correlation having a distinct delay and provide a CFO estimate based on the plurality of auto-correlations. The signal processing system further includes a CFO correction circuit configured to frequency compensate the signal data with the CFO estimate. The signal processing system further includes a cross-correlation bank configured to dynamically provide a plurality of parallel cross-correlations of the frequency compensated signal data to resolve ambiguity in the CFO estimate.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
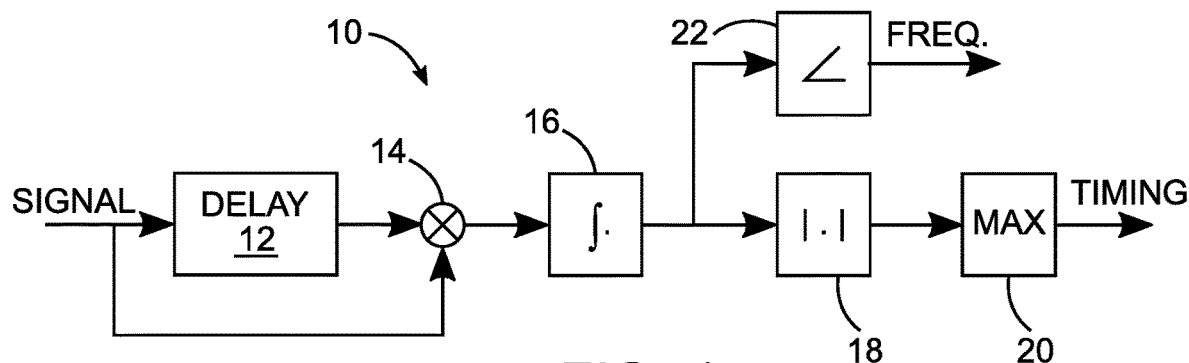
FIG. 1 is a schematic diagram of a conventional autocorrelation technique for detecting low power radio preambles.
Figure 2:
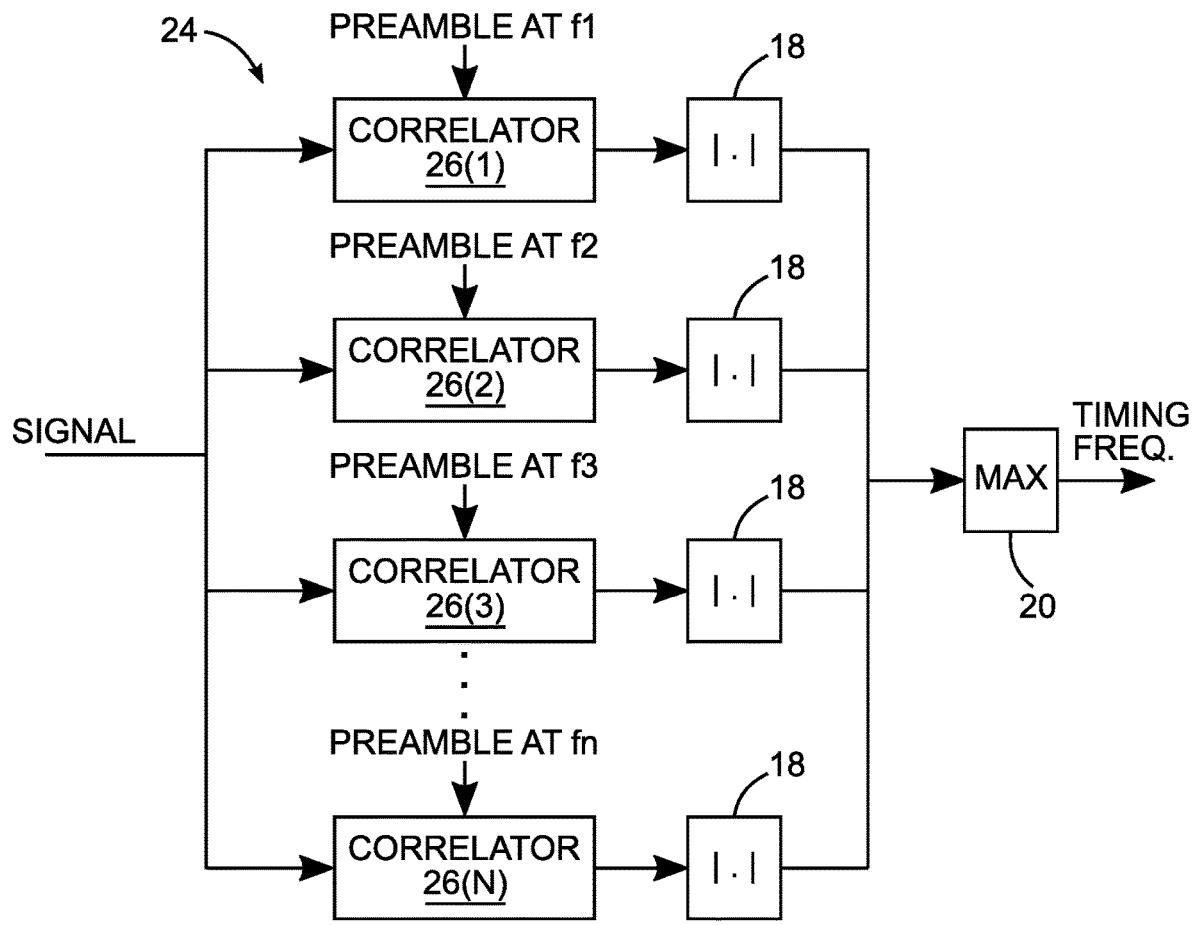
FIG. 2 is a schematic diagram of a conventional cross-correlation technique for detecting low power radio preambles.
Figure 3:
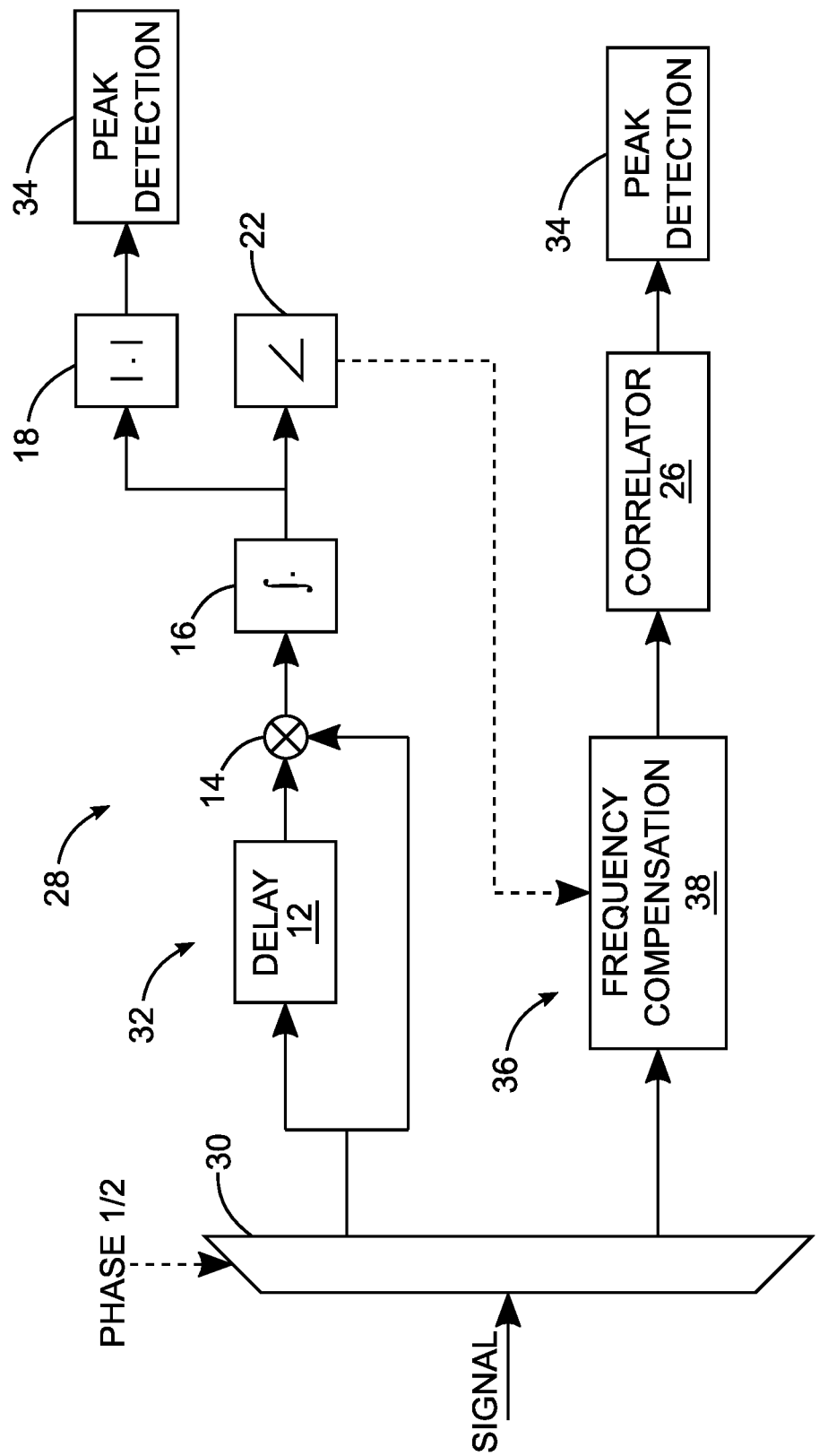
FIG. 3 is a schematic diagram of a conventional synchronizing approach for synchronizing to a WiFi orthogonal frequency division multiplexed (OFDM) radio preamble.
Figure 4:
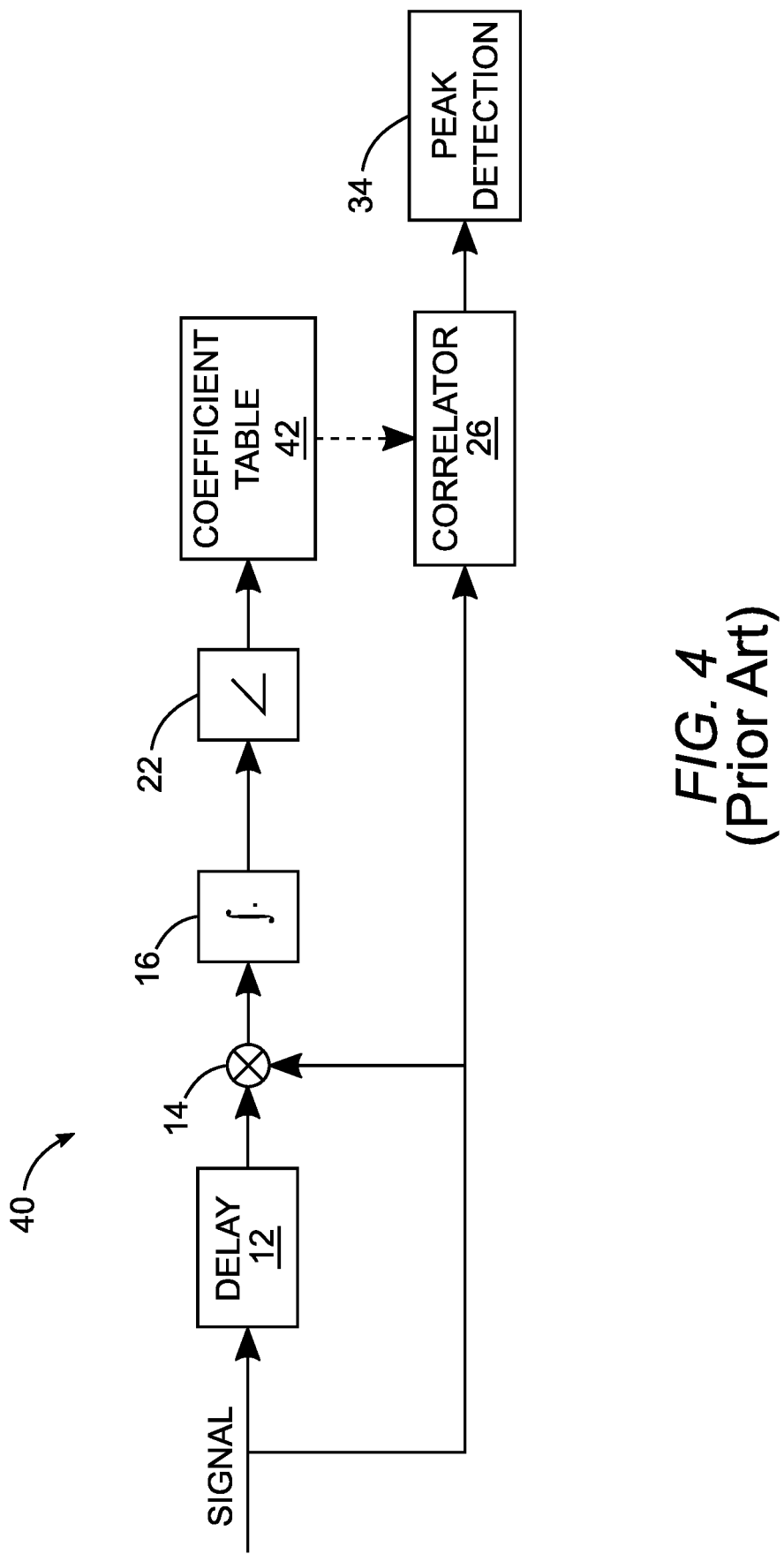
FIG. 4 is a schematic diagram of an auto-correlation and cross-correlation hybrid approach for detecting a radio preamble.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

This application relates to adaptive multi-standard signal classification and synchronization. Devices, systems and methods disclosed herein include an auto-correlation bank and a signal classifier to efficiently and reliably distinguish signals of wireless protocols, such as Bluetooth, 1 megabit-per-second (Mbps) Bluetooth low energy (BLE), 2 Mbps BLE, long range (LR) BLE, ZigBee (ZB), high-rate ZB, and so on. The auto-correlation bank includes a set of auto-correlators with different delays, which facilitate distinguishing between the different wireless protocols. Exemplary aspects can further distinguish and/or compensate for interference sources, such as WiFi, constant wave (CW) clock sources, and so on. In some examples, a frequency offset of an incoming signal can be output for further signal processing.

In another exemplary aspect, a parallel path is provided to frequency-compensate the incoming signal using an estimate of the carrier frequency offset (CFO) from the auto-correlation bank. This reduces the number of parallel correlators needed for synchronization of the incoming signal. The frequency compensated data can be cross-correlated against preamble coefficients of signal standards (e.g., BLE, LR BLE, or ZB) depending on the result of the signal classifier. If the signal classifier detects signals that are not relevant for the system, such as CW interference, WiFi interference, or noise, the correlators can be disabled. In addition, the number of correlators and correlation lengths can be scaled as needed depending on the type of incoming signal. This approach therefore re-uses hardware, saving cost and area, while conserving power by scaling key processing units depending on the incoming signal. Using a cross-correlation block for packet synchronization allows for more reliable performance, which is especially important for low data rate internet of things (IoT) standards operating at low signal to noise ratio (SNR), such as ZB and LR BLE.

Figure 5:
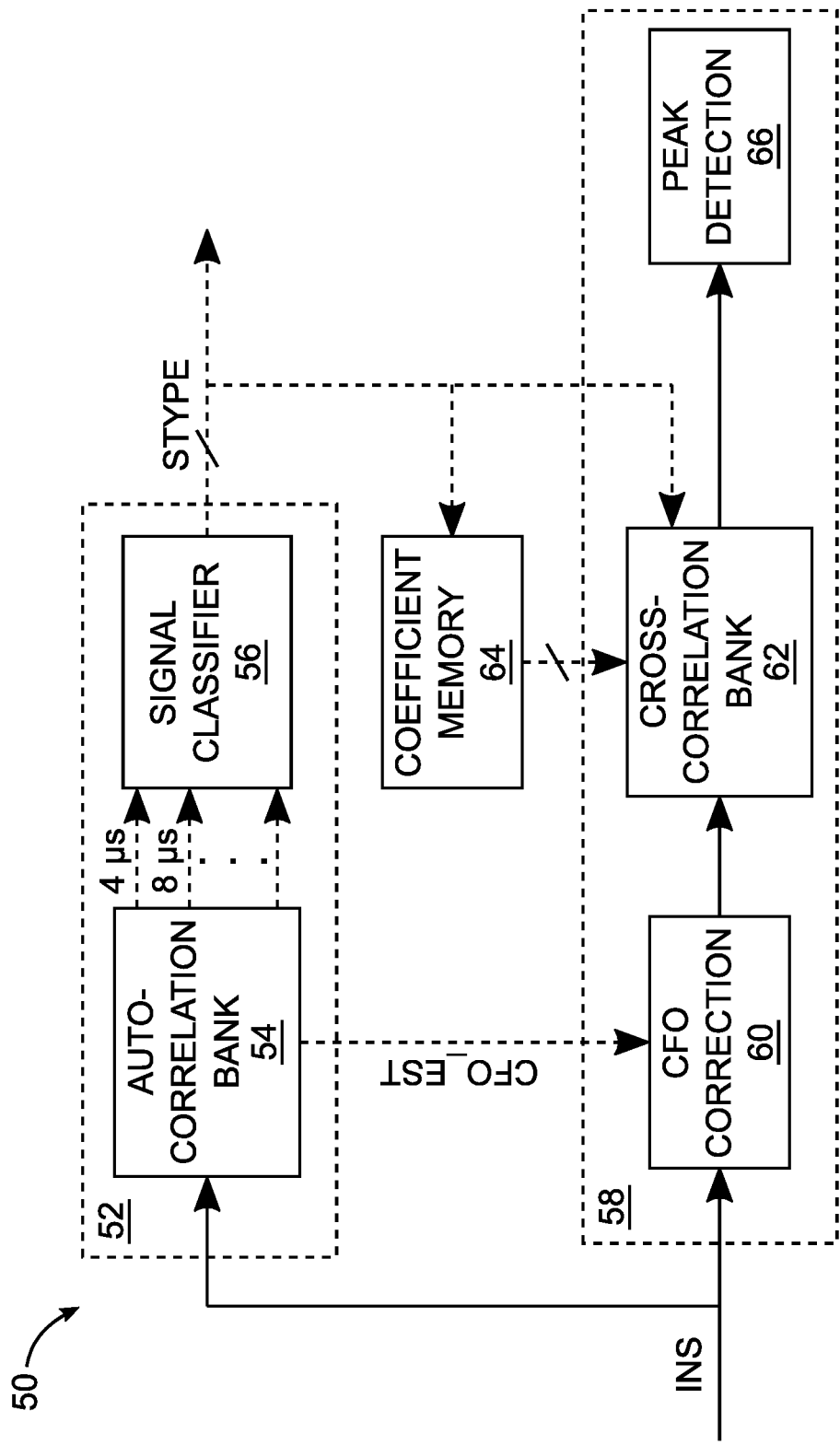
FIG. 5 is a schematic diagram of an exemplary signal processing system configured to adaptively classify and synchronize to an incoming signal.

FIG. 5 is a schematic diagram of an exemplary signal processing system 50 configured to adaptively classify and synchronize to an incoming signal INS. The signal processing system 50 includes a signal detector 52 for receiving and classifying signals. The signal detector 52 includes an auto-correlation bank 54 which receives signal data for the incoming signal INS and auto-correlates the signal at different delays (e.g., 4 µs, 8 µs, etc.). A signal classifier 56 is configured to classify the incoming signal INS based on outputs of the auto-correlation bank 54, and may further output a classification signal STYPE.

In an exemplary aspect, the signal detector 52 can reliably distinguish signals of multiple wireless protocols, such as Bluetooth, 1 Mbps BLE, 2 Mbps BLE, LR BLE, ZB, high-rate ZB, and so on, as well as interference sources such as WiFi and CW clock signals at a low cost and power. In some examples, the signal detector 52 can output an estimated CFO signal CFO_EST of the incoming signal INS. The signal detector 52 is described in further detail below with respect to FIGS. 6 and 7.

In a parallel path, a cross-correlation circuit 58 facilitates synchronizing to the incoming signal INS. The signal data for the incoming signal INS can first be frequency compensated (e.g., by a CFO correction circuit 60 or similar function) using the estimated CFO signal CFO_EST from the auto-correlation bank 54. This reduces the number of parallel correlators needed for synchronization in a cross-correlation bank 62.

The cross-correlation bank 62 cross-correlates the frequency compensated signal data against either ZB, BLE, or LR BLE preamble coefficients depending on the result of the signal classifier 56 (e.g., with the classification signal STYPE, which may be stored in coefficient memory 64). If the signal classifier 56 detects signals that are not relevant for the system 50 or a current application operated on the system 50, such as CW interference, WiFi interference, or noise, the cross-correlation bank 62 can be disabled to conserve power. In addition, the number of correlators and correlation lengths in the cross-correlation bank 62 can be scaled as needed depending on the type of the incoming signal INS (e.g., as indicated by the classification signal STYPE).

The signal processing system 50 therefore re-uses hardware, saving cost and area while conserving power by scaling key processing units depending on the current incoming signal INS. Finally, using the cross-correlation circuit 58 for final packet synchronization allows for more reliable performance. This reliability is particularly important for low data rate IoT standards operating at low SNR, such as ZB and LR BLE.

The incoming signal INS may be further processed using additional circuitry, such as peak detection circuitry 66. The cross-correlation circuit 58 is further described below with respect to FIG. 8. It should be understood that the signal data of the incoming signal INS can be down-converted to baseband or low-intermediate frequency (IF), and raw in-phase/quadrature (I/Q) samples can be received at the input to the signal processing system 50.

Figure 6:
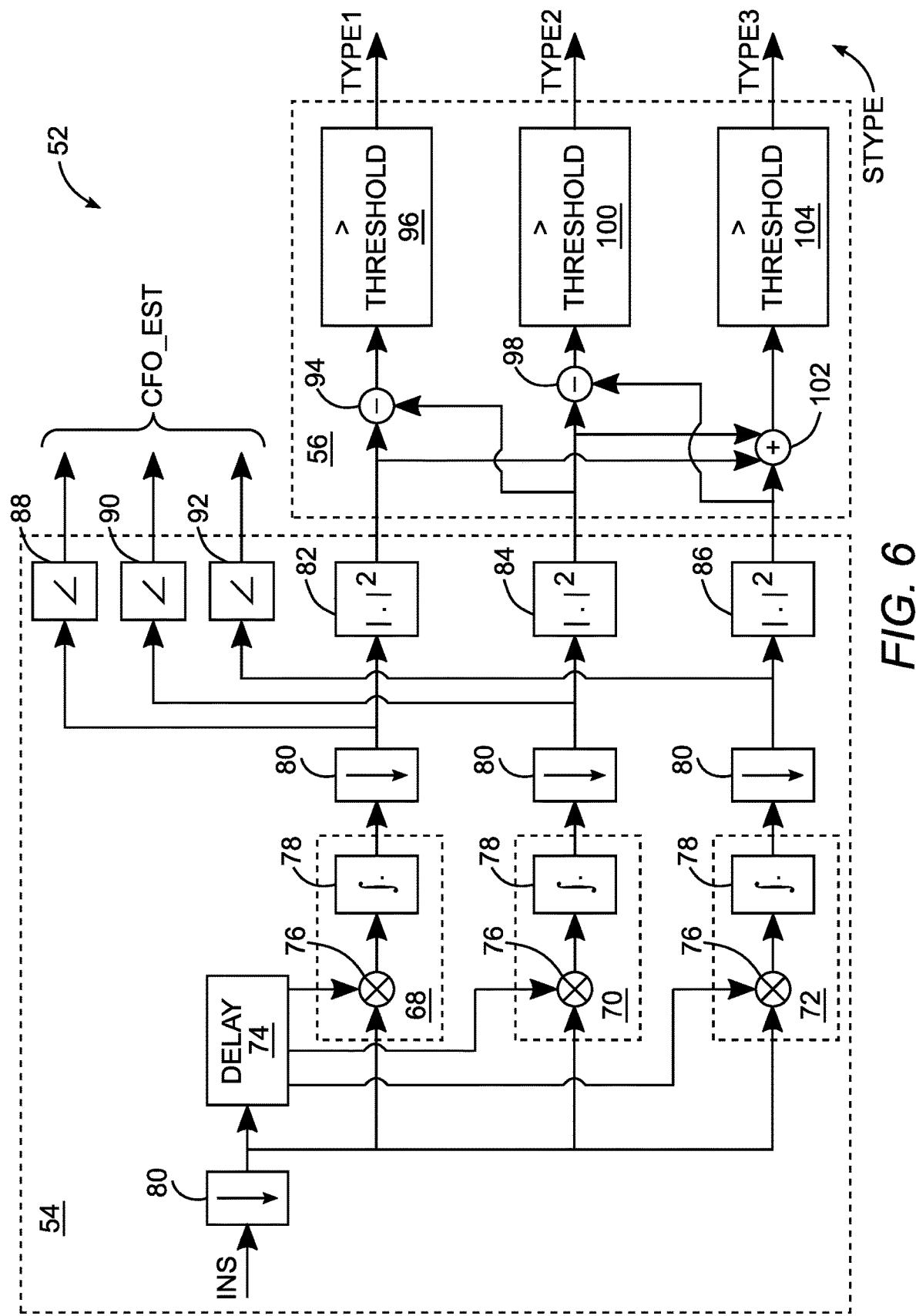
FIG. 6 is a schematic diagram of an exemplary signal detector for the signal processing system of FIG. 5.

FIG. 6 is a schematic diagram of an exemplary signal detector 52 for the signal processing system 50 of FIG. 5. The signal detector 52 is divided into sub-blocks: the auto-correlation bank 54 and the signal classifier 56. In this example, the signal data of the incoming signal INS received by the auto-correlation bank 54 is hard-limited I/Q data. The auto-correlation bank 54 includes two or more auto-correlators 68, 70, 72 which correlate the signal data against itself at different delays received from a delay circuit 74. Each auto-correlator 68, 70, 72 includes a multiplier 76 and an accumulator 78 (e.g., an integrator). In the example illustrated, a first auto-correlator 68 is configured to correlate the signal data against itself at a first delay of 16 μs, a second auto-correlator 70 is configured to correlate the signal data against itself at a second delay of 8 μs, and a third auto-correlator 72 is configured to correlate the signal data against itself at a third delay of 4 μs.

In some examples, a down-sample function 80 can be used at the input to the auto-correlation bank 54 and/or the output of each auto-correlator 68, 70, 72 to conserve power depending on a desired resolution. The magnitude of the signal output from each auto-correlator 68, 70, 72 can be measured by a corresponding first magnitude function 82, a second magnitude function 84, and a third magnitude function 86 and sent to the signal classifier 56. The CFO can be estimated from the signal output from each auto-correlator 68, 70, 72 by a corresponding first offset function 88, a second offset function 90, and a third offset function 92 and sent to the CFO correction circuit 60 of FIG. 5 to aid in synchronization. The offset functions 88, 90, 92 can be configured to compute the phase angle of the output of the corresponding auto-correlator 68, 70, 72 to produce the estimated CFO signal CFO_EST.

The signal classifier 56 then simultaneously analyzes all the auto-correlator 68, 70, 72 outputs (e.g., the outputs of the magnitude functions 82, 84, 86) to determine a type of the incoming signal INS. In the example illustrated in FIG. 6, the type can be determined between ZB, LR BLE, and CW as follows:

The magnitude of the output of the first auto-correlator 68 (e.g., at a 16 μs delay) will be high for ZB, LR BLE preambles, and CW.

The magnitude of the output of the second auto-correlator 70 (e.g., at an 8 μs delay) will be high for LR BLE preambles and CW, but low for ZB.

The magnitude of the output of the third auto-correlator 72 (e.g., at a 4 μs delay) will be high for CW only, but low for ZB and LR BLE.

In greater detail, because the ZB preamble has a period of 16 μs, the 16 μs auto-correlation result will rise to a high value when a ZB preamble arrives. However, this is also true for LR BLE signals and CW signals. Thus, a pure auto-correlation function is not useful for distinguishing between these types of signals. Instead, the signal classifier 56 uses a linear combination of two or more auto-correlators 68, 70, 72 with different delays to classify signals.

In the example signal classifier 56, the output of the second magnitude function 84 (e.g., for the second auto-correlator 70 at an 8 μs delay) is subtracted from the output of the first magnitude function 82 (e.g., for the first auto-correlator 68 at a 16 μs delay) at a first adder 94 to yield indication of a first signal type (e.g., ZB). A first threshold detector 96 outputs a first classification signal TYPE1 from this combination of auto-correlation functions. The first classification signal TYPE1 will remain high for a ZB packet because the 16 μs auto-correlation magnitude (output by the first magnitude function 82) will be high as before, but the 8 μs auto-correlation result (output by the second magnitude function 84 and unmatched to the 16 μs ZB preamble period) will be very low.

In contrast, the first classification signal TYPE1 will be low for LR BLE, CW, and noise inputs. For LR BLE preambles, having a period of 8 μs, both magnitude functions 82, 84 will be high so the net result from the first adder 94 will be nearly zero. CW signals have high auto-correlation results for all auto-correlation functions, and the net result of the magnitude functions 82, 84 will be nearly zero. Other signals, such as 1 Mbps BLE, 2 Mbps BLE, and noise will produce low auto-correlation results from the magnitude functions 82, 84 as there is no 8 μs or 16 μs repeating patterns. Thus, while one auto-correlation result by itself is not useful for distinguishing signal types, combining two or more auto-correlation results with different delays together can be very effective.

Additional signal types can be indicated using other results of the auto-correlators 68, 70, 72. For example, the output of the third magnitude function 86 (e.g., for the third auto-correlator 72 at a 4 μs delay) is subtracted from the output of the second magnitude function 84 (e.g., for the second auto-correlator 70 at a 4 μs delay) at a second adder 98 to yield indication of a second signal type (e.g., LR BLE). A second threshold detector 100 outputs a second classification signal TYPE2 from this combination of auto-correlation functions. In this case, both magnitude functions 84, 86 will be high for CW yielding a difference at the second adder 98 near zero, and both auto-correlator results will be low for ZB also yielding a result near zero. However, the result of this combination will be high for LR BLE preambles having a period of 8 µs. Additional signal types can be detected using additional combinations of auto-correlation functions as desired.

In addition, the signal classifier 56 can be used to detect CW and other interference. For example, the outputs of the first magnitude function 82, the second magnitude function 84, and the third magnitude function 86 can be summed at a third adder 102. A third threshold detector 104 outputs a third classification signal TYPE3 to indicate CW interference. This can be used to avoid false-detections or deactivate the signal processing system 50 of FIG. 5 (e.g., some or all components of an RF radio in a mobile device, IoT device, home automation device, etc.) in the event CW interference is detected.

The signal detector 52 of FIG. 6 can be adapted to distinguish between any radio systems using preambles having different repeating periods. It should be understood that such embodiments of the signal detector 52 can include more or fewer auto-correlators 68, 70, 72, magnitude functions 82, 84, 86, and so on in order to identify these radio systems. For example, the signal detector 52 can detect regular BLE signals by including auto-correlators having 2 µs and 1 µs delays. In some examples, the results of the auto-correlation bank 54 can be scaled and combined to create linear combinations of outputs of the auto-correlators 68, 70, 72 useful for classifying signals. This can account for differing moving average lengths or for preamble patterns that partially correlate at one delay, but fully correlate at another delay. Similarly, the addition/subtraction logic of the signal classifier 56 can be supplemented by hysteresis or replaced with other forms of logic that accomplish a similar goal. An example is summarized in Table 1 below:

TABLE 1

| Auto-correlation delay | BLE preamble (2 µs period) | LR BLE preamble (8 µs period) | ZB Preamble (16 µs period) | CW | AWGN |
|---|---|---|---|---|---|
| 1 µs | LOW | LOW | LOW | HIGH | LOW |
| 2 µs | HIGH | LOW | LOW | HIGH | LOW |
| 4 µs | HIGH | LOW | LOW | HIGH | LOW |
| 8 µs | LOW | HIGH | LOW | HIGH | LOW |
| 16 µs | LOW | HIGH | HIGH | HIGH | LOW |

Each row of Table 1 represents an auto-correlation function with a different delay ranging from 1 µs-16 µs, though other auto-correlation delays can be considered depending on the type of preamble searched for. "LOW" indicates a low magnitude for that auto-correlator delay in the presence of the specified preamble (BLE, LR BLE, and ZB), while "HIGH" represents a high magnitude. Each type of signal of interest in Table 1 has a unique "signature" of auto-correlation outputs which can be used to classify the signal type.

In the present context, this information from the signal detector 52 is used to enable/disable cross-correlators and select appropriate correlator coefficients to synchronize to a signal of interest, as described further below with respect to FIG. 8. However, the proposed algorithm can be extended to enable, disable, or otherwise control any relevant processing blocks not required for the present signal conditions. In addition, the signal detector 52 is effective for identifying high power signals even if they are located on another frequency channel. This is because periodic preambles maintain the same periodicity even at the output of a linear filter system. This can be useful in other contexts, such as classifying interferers having specific repeating preamble patterns (e.g., WiFi interferers) on another channel and adjusting gain settings.

In some examples, the signal detector 52 can identify signals in time-multiplexing multi-standard applications, and can wake up or otherwise enable radios that detect packets based on a sudden increase in signal level. For example, the onset of a new signal type could be detected by a sudden increase in signal level from an adjacent channel. To determine if the signal is from a relevant standard on the current channel, the signal detector 52 can be deployed to determine what type of preamble caused the level increase. If the packet is not relevant, the radio can be put back to sleep or otherwise disabled. If a relevant packet is identified on another channel, the radio can switch to another frequency channel to find and synchronize to the packet.

It should be understood that some or all components of the signal processing system 50 of FIG. 5 can be implemented in software rather than hardware. For example, the signal classifier 56 can be implemented using a logic table such as shown in Table 1. By reducing the algorithm output sampling rate and making the results of each auto-correlator 68, 70, 72 available to a micro-processor or digital signal processor (DSP), such a logic table can be implemented in software to facilitate more sophisticated and flexible control of a radio based on the type of signal detected by the signal detector 52.

Figure 7:
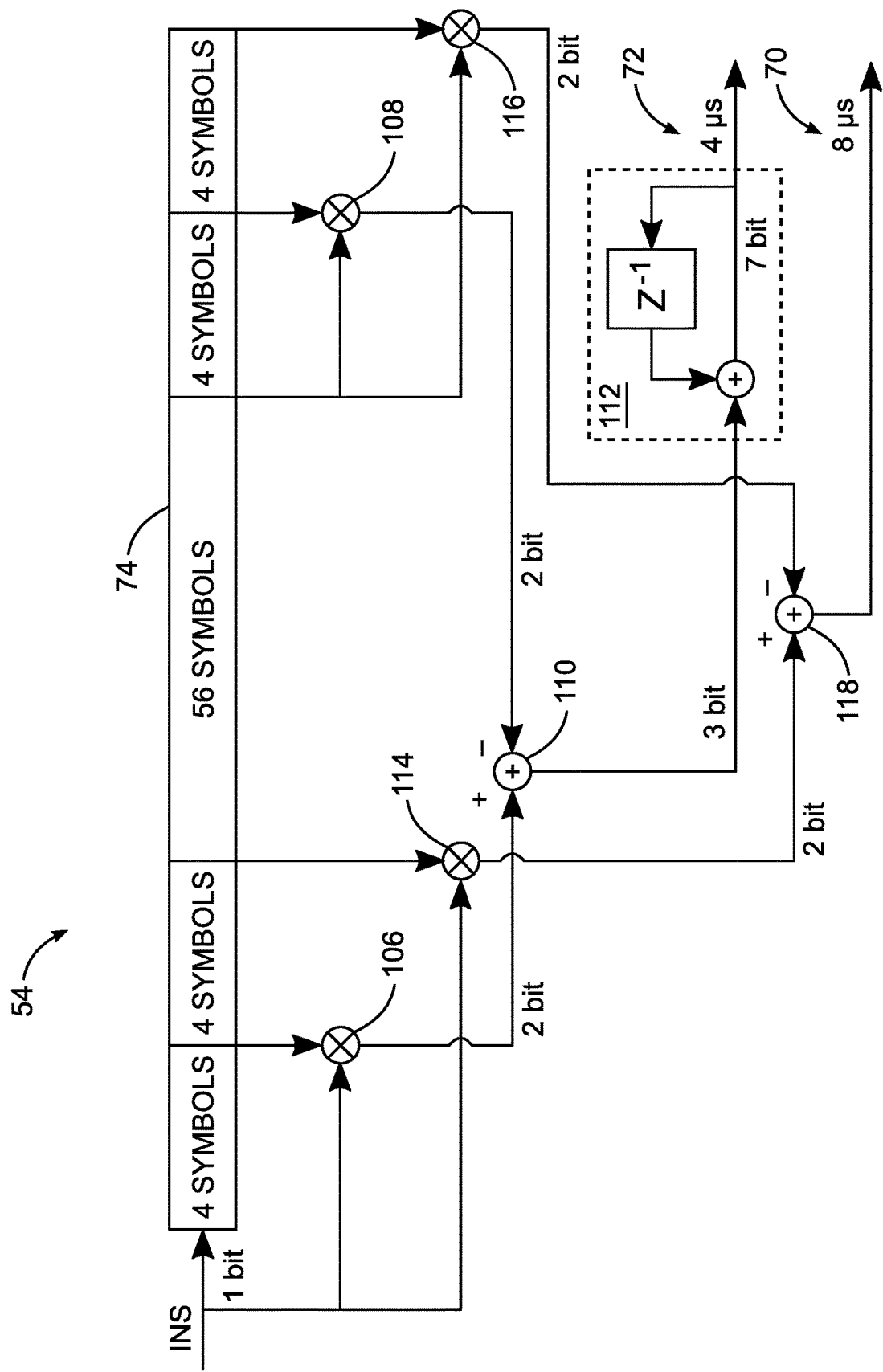
FIG. 7 is a schematic diagram of an exemplary implementation of the auto-correlation bank of FIG. 6.

FIG. 7 is a schematic diagram of an exemplary implementation of the auto-correlation bank 54 of FIG. 6. The signal data of the incoming signal INS can be hard-limited to reduce computational complexity. The third auto-correlator 72 (at a 4 µs delay) is constructed using a 64 µs moving average from two 1-bit auto-correlation samples (ACs) 106, 108. An initial AC 106 is constructed by multiplying the incoming signal data (e.g., I/O data of the incoming signal INS) with the signal data delayed by 4 µs. A delayed AC 108 is computed 64 µs later and subtracted at an AC adder 110 from the results of the initial AC 106. This is fed to an accumulator 112 to implement the 64 µs moving average for the third auto-correlator 72. The second auto-correlator 70 (at an 8 µs delay) shares the delay circuit 74 and is constructed in a similar manner (e.g., with a second initial AC 114, a second delayed AC 116, and a second AC adder 118).

This implementation has several advantages compared to the conventional implementations of FIGS. 1-4. For example, memory elements (e.g., the delay circuit 74) can be re-used among multiple auto-correlators 68, 70, 72 to reduce power and size of the signal detector 52. In addition, hard-limiting the signal data of the incoming signal INS reduces memory and arithmetic unit sizes while still providing good performance. In addition, the memory element (e.g., the delay circuit 74) needed to implement the moving average is reduced because it only operates on the 1-bit inputs rather than multi-bit auto-correlator outputs.

Figure 8:
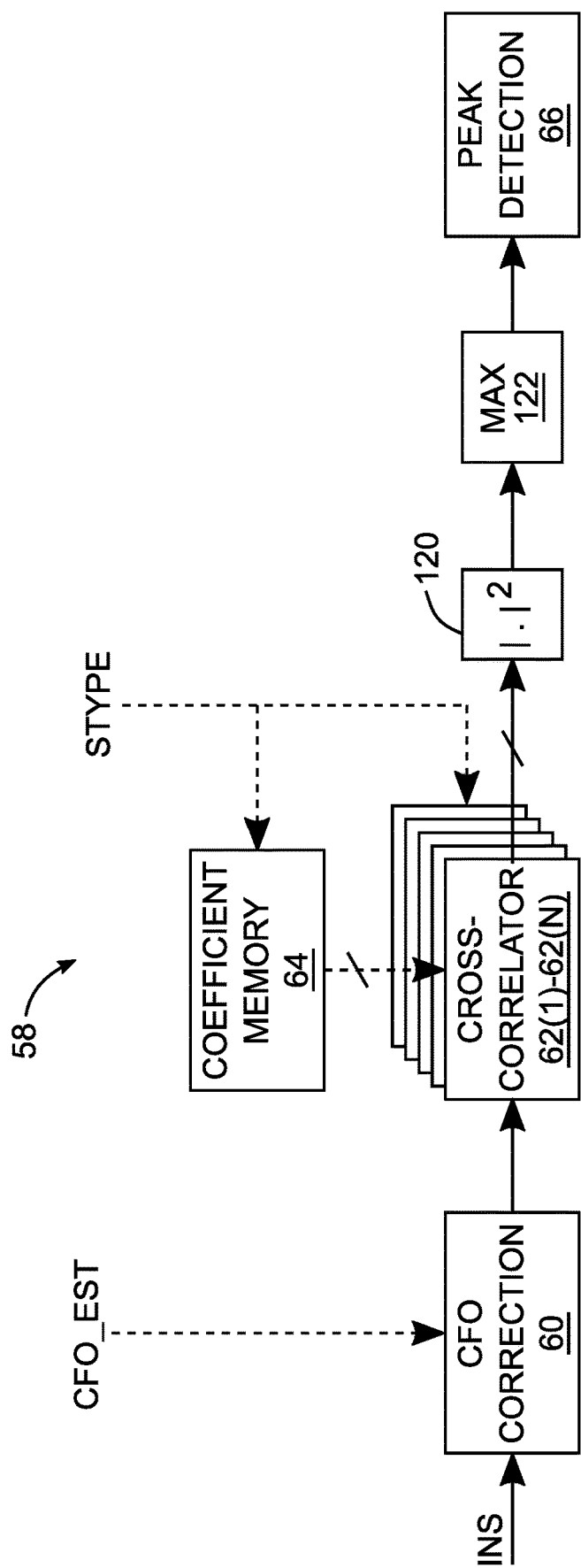
FIG. 8 is a schematic diagram of an exemplary cross-correlation circuit for the signal processing system of FIG. 5.

FIG. 8 is a schematic diagram of an exemplary cross-correlation circuit 58 for the signal processing system 50 of FIG. 5. The cross-correlation circuit 58 uses the estimated CFO signal CFO_EST from the auto-correlation bank 54 of FIG. 6 to facilitate efficient synchronization with the incoming signal INS. However, auto-correlators, such as those used in the auto-correlation bank 54, have a limited frequency range inversely proportional to the period of the preamble of a signal. This is particularly a concern for low-cost, low-data rate systems like LR BLE and ZB. These standards allow for inaccurate clock crystals having large frequency offsets to satisfy IoT cost requirements, while the lower symbolling rates result in longer periodic patterns and hence a smaller frequency range. The CFO range can be calculated from the preamble period as follows:

$$f_{max} = \pm \frac{1}{2T}$$

As an example, the LR BLE preamble has a period of T=8 µs and thus a CFO estimate range of +/−62.5 kiloHertz (kHz). Due to phase ambiguity, the estimated CFO signal CFO_EST from the auto-correlation bank 54 cannot be used to distinguish, for example, a frequency offset of 62.5 kHz and −62.5 kHz since they result in the same auto-correlation phase. To resolve the frequency range limits of the estimated CFO signal CFO_EST from the auto-correlation bank 54, the cross-correlation circuit 58 is implemented as shown in FIG. 8. The cross-correlation circuit 58 is described with regard to LR BLE preamble as an example, but it should be understood that a similar circuit can be designed for any repeating preamble.

In this regard, the CFO correction circuit 60 corrects the frequency offset of the signal data of the incoming signal INS using the estimated CFO signal CFO_EST from the auto-correlation bank 54 of FIG. 6. Due to the phase ambiguity discussed above, the CFO value for an LR BLE preamble will be approximately equal to the correct CFO value+/−N*125 kHz for N=0, 1, 2 since the standard constrains the allowable crystal tolerance to better than 50 parts per million (ppm), corresponding to a maximum frequency error of 250 kHz. To determine which value is correct and synchronize to the preamble, multiple (for LR BLE, five) parallel cross-correlators 62(1)-62(N) perform correlations for each possibility and select the largest value. Thus, the coefficients of outputs from the cross-correlators 62(1)-62(N) represent the expected preamble shifted by 0 kHz, +/−125 kHz, and +/−250 kHz. The cross-correlator 62(1)-62(N) resulting in the largest peak is used for timing and frequency synchronization. This may be determined using a magnitude function 120, a maximizing function 122, and/or the peak detection circuitry 66.

In conventional cross-correlation algorithms, the number of cross-correlators is typically proportional to the length of the correlation, while for the cross-correlation circuit 58 the number of cross-correlators 62(1)-62(N) is proportional to the length of the preamble's repeating pattern. For the case of LR BLE operating at low SNR, having a preamble length of 80 µs but a repeating period of only 8 µs, this represents a factor 10 savings in the number of parallel correlations needed. When used in combination with the signal detector 52 of FIGS. 6 and 7, the cross-correlation circuit 58 only needs to be enabled when a relevant preamble is present. Furthermore, the number of active cross-correlators 62(1)-62(N) and the length of the correlation can be scaled automatically based on the type of preamble detected.

As an example, if the classification signal STYPE from the signal classifier 56 indicates additive white Gaussian noise (AWGN) because all magnitudes from the auto-correlation bank 54 are low, then the entire cross-correlation circuit 58 can be disabled to conserve power. Alternatively, if the signal detector 52 detects the presence of an LR BLE preamble with a period of 8 µs, five cross-correlators 62(1)-62(N) are activated to manage the phase ambiguity. In addition, the length of the cross-correlation is set to 80 µs for reliable detection at low SNR (or another appropriate length), the LR BLE preamble coefficients are loaded from the coefficient memory 64, and the packet carried by the incoming signal INS is detected.

In another example (such as at a later time), a BLE packet arrives with a period of 2 µs. In this case, only two cross-correlators 62(1)-62(N) are needed to handle the phase ambiguity. The length of the correlation is set to 8 µs for reliable detection at the higher operating SNR of BLE, the BLE packets are loaded, and the packet carried by the incoming signal INS is detected. In this manner, the signal processing system 50 of FIGS. 5-8 conserves power by scaling the correlator hardware resource as needed depending on the properties of the current incoming signal INS and saves area by re-using the same correlator resource for the multiple standards supported by the radio.

Those skilled in the art will recognize improvements and modifications to the preferred embodiments of the present disclosure. All such improvements and modifications are considered within the scope of the concepts disclosed herein and the claims that follow.

What is claimed is:

1. A signal detector, comprising:
an auto-correlation bank configured to receive signal data for an incoming signal and comprising:
a delay circuit configured to provide the signal data at a first delay and the signal data at a second delay;
a first auto-correlator configured to correlate the signal data against itself at the first delay, wherein the first auto-correlator provides a moving average of accumulated results from a difference between an initial auto-correlation sample (AC) and a delayed AC; and
a second auto-correlator configured to correlate the signal data against itself at the second delay;
a signal classifier configured to classify the incoming signal based on a first output of the first auto-correlator and a second output of the second auto-correlator; and
a cross-correlation circuit in parallel with the auto-correlation bank and configured to perform multiple parallel cross-correlations according to a classification of the incoming signal.

2. The signal detector of claim 1, wherein the initial AC and the delayed AC are 1-bit ACs.

3. The signal detector of claim 1, further comprising an offset function configured to provide an estimated carrier frequency offset (CFO) signal based on a phase angle of the first output.

4. The signal detector of claim 1, wherein the signal classifier is configured to receive a first magnitude of the first output and a second magnitude of the second output.

5. The signal detector of claim 4, wherein the signal classifier is configured to classify the incoming signal based on a linear or non-linear combination of the first magnitude and second magnitude.

6. The signal detector of claim 4, wherein the signal classifier can distinguish between signal types comprising at least two or more of: Bluetooth, 1 megabit-per-second (Mbps) Bluetooth low energy (BLE), 2 Mbps BLE, long range (LR) BLE, ZigBee (ZB), high-rate ZB, constant wave (CW) clock sources, WiFi interference, or additive white Gaussian noise (AWGN).

7. The signal detector of claim 6, wherein the signal classifier comprises a logic table to distinguish the signal types using the first magnitude and the second magnitude.

8. The signal detector of claim 1, wherein the auto-correlation bank further comprises a third auto-correlator configured to correlate the signal data against itself at a third delay.

9. A method for detecting a wireless signal, comprising:
receiving signal data for an incoming signal;
performing a first auto-correlation of the signal data at a first delay;
performing a second auto-correlation, concurrent with the first auto-correlation, of the signal data at a second delay; classifying the incoming signal based on a first magnitude of the first auto-correlation and a second magnitude of the second auto-correlation; and
cross-correlating the signal data in parallel with the first auto-correlation and the second auto-correlation, wherein the cross-correlating comprises multiple parallel cross-correlations according to a classification of the incoming signal.

10. The method of claim 9, further comprising down sampling the signal data prior to performing the first auto-correlation.

11. The method of claim 9, wherein the first auto-correlation comprises a moving average between an initial auto-correlation and a delayed auto-correlation.

12. The method of claim 9, wherein classifying the incoming signal comprises:
subtracting the first magnitude from the second magnitude to yield a net difference; and
determining whether the net difference exceeds a threshold.

13. A signal processing system for an incoming signal, comprising:
an auto-correlation bank configured to:
perform a plurality of auto-correlations of signal data of the incoming signal, each auto-correlation having a distinct delay; and
provide a carrier frequency offset (CFO) estimate based on the plurality of auto-correlations;
a signal classifier configured to identify a signal type of the incoming signal based on magnitudes of the plurality of auto-correlations;
a CFO correction circuit configured to frequency compensate the signal data with the CFO estimate; and
a cross-correlation bank configured to dynamically provide a plurality of parallel cross-correlations of the frequency compensated signal data to resolve ambiguity in the CFO estimate, wherein a number of the plurality of parallel cross-correlations is selected based on the signal type.

14. The signal processing system of claim 13, wherein the cross-correlation bank is disabled when the signal type is not relevant for the signal processing system or a current application operated on the signal processing system.

15. A signal detector, comprising:
an auto-correlation bank configured to receive signal data for an incoming signal and comprising:
a first auto-correlator configured to correlate the signal data against itself at a first delay; and
a second auto-correlator configured to correlate the signal data against itself at a second delay;
a signal classifier configured to classify the incoming signal, the signal classifier comprising a logic table to distinguish signal types based on a first magnitude of a first output of the first auto-correlator and a second magnitude of a second output of the second auto-correlator; and
a cross-correlation circuit in parallel with the auto-correlation bank and configured to perform multiple parallel cross-correlations according to a classification of the incoming signal;
wherein the signal classifier can distinguish between signal types comprising at least two or more of: Bluetooth, 1 megabit-per-second (Mbps) Bluetooth low energy (BLE), 2 Mbps BLE, long range (LR) BLE, ZigBee (ZB), high-rate ZB, constant wave (CW) clock sources, WiFi interference, or additive white Gaussian noise (AWGN).

16. The signal detector of claim 15, wherein the auto-correlation bank further comprises a delay circuit configured to provide the signal data at the first delay and the signal data at the second delay.

17. The signal detector of claim 16, wherein the first auto-correlator provides a moving average from an initial auto-correlation sample (AC) and a delayed AC.

18. The signal detector of claim 17, wherein the initial AC and the delayed AC are 1-bit ACs.

19. The signal detector of claim 17, wherein the initial AC is configured to multiply the signal data with delayed signal data from the delay circuit.

20. The signal detector of claim 19, wherein the moving average comprises accumulated results from a difference between the initial AC and the delayed AC.

21. The signal detector of claim 15, further comprising an offset function configured to provide an estimated carrier frequency offset (CFO) signal based on a phase angle of the first output.

* * * * *